(12) United States Patent
Pohlmann et al.

(10) Patent No.: US 8,650,260 B2
(45) Date of Patent: Feb. 11, 2014

(54) UNIVERSAL STORAGE MANAGER FOR MODIFYING STORAGE INFRASTRUCTURE IN MULTI-TENANT COMPUTING SYSTEM

(75) Inventors: Michael Pohlmann, Heidelberg (DE); Alex Gruener, Walldorf (DE)

(73) Assignee: SAP AG, Walldorf (DE)

( * ) Notice: Subject to any disclaimer, the term of this patent is extended or adjusted under 35 U.S.C. 154(b) by 402 days.

(21) Appl. No.: 12/840,111

(22) Filed: Jul. 20, 2010

(65) Prior Publication Data

US 2012/0023187 A1    Jan. 26, 2012

(51) Int. Cl.
*G06F 13/00*    (2006.01)

(52) U.S. Cl.
USPC .......................................................... 709/215

(58) Field of Classification Search
USPC ............................................... 709/213, 215
See application file for complete search history.

(56) References Cited

U.S. PATENT DOCUMENTS

2008/0114792 A1*    5/2008    LaMonica ..................... 707/100

* cited by examiner

*Primary Examiner* — Robert B Harrell
(74) *Attorney, Agent, or Firm* — Mintz Levin Cohn Ferris Glovsky and Popeo, P.C.

(57) ABSTRACT

In one aspect, a universal storage manager in a multi-tenant computing system receives at least one message requesting a change to a storage infrastructure of the multi-tenant computing system. Thereafter, the universal storage manager associates the requested change with one of a plurality of operations changing the storage infrastructure. Once this association is made, the universal storage manager initiates the associated operation to change the storage infrastructure. Related apparatus, systems, techniques and articles are also described.

19 Claims, 5 Drawing Sheets

UNIVERSAL STORAGE MANAGER FOR MODIFYING STORAGE INFRASTRUCTURE IN MULTI-TENANT COMPUTING SYSTEM

TECHNICAL FIELD

The subject matter described herein relates to the management of storage resources for demands of a multi-tenant computing system using a universal storage manager.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Such an approach can introduce several challenges. As one example, interfacing with and initiating operations in a storage infrastructure can be technically difficult in complex IT landscapes and can additionally consume significant processing resources.

SUMMARY

In one aspect, a universal storage manager in a multi-tenant computing system receives at least one message requesting a change to a storage infrastructure of the multi-tenant computing system. In such an arrangement, the storage infrastructure can include at least one network attached storage device. Thereafter, the universal storage manager associates the requested change with one of a plurality of operations changing the storage infrastructure. Once this association is made, the universal storage manager initiates the associated operation to change the storage infrastructure.

The multi-tenant computing system can form part of a multi-tenant environment using a single software delivery architecture. The multi-tenant computing system can include the storage infrastructure, at least one application server accessible over a network from the plurality of clients associated with each of multiple tenants, and at least one data repository. The at least one data repository can contain core software platform content relating to the operation of the multi-tenant computing system which is not modifiable by the multiple tenants, system content including data objects created in runtime by the multi-tenant computing system that are modifiable with data provided by a corresponding tenant, and tenant content including data objects or extensions to data objects that are customized for a corresponding tenant, wherein data objects or extensions to data objects of a particular tenant are not available to other tenants.

One or more of the following variations can also be implemented depending on the desired configuration. The universal service manager can comprise an agent framework. The agent framework of the universal service manager can be coupled to at least a second agent framework on a host agent. The agent framework can define a plurality of execution units for executing the operations. The operations can be performed by calling a web service interface associated with the corresponding execution unit. The universal storage manager can comprise a splitter to split cloned storage volumes in the storage infrastructure. The storage infrastructure can comprise a primary storage device and a lifecycle storage device, wherein access to the primary storage device is faster than access to the lifecycle storage device. The universal storage manager can further include a lifecycle application programming interface (API) to observe a process of synchronizing data stored in the primary storage device on the lifecycle storage device.

The at least one message can be received from a central management system within the multi-tenant computing system. In such an arrangement, the central management system can provide an interface between the multi-tenant computing system and remote clients external to the multi-tenant computing system that are associated with the tenants. The messages requesting the change can be, for example, XML/SOAP messages transported via HTTPs.

Articles of manufacture are also described that comprise computer executable instructions permanently stored on computer readable media (e.g., non-transitory computer readable media), which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, the current subject matter allows for the storage infrastructure of a multi-tenant computing system to perform dynamic changes in an automatic and secure fashion. More specifically, the current subject matter allows for the copy of tenant data in a multi-tenant computing system via snapshots and/or cloning on a storage device. The current subject matter can also be implemented to interact with a central management system that triggers a variety of tenant-specific operations. The dynamic changes can pertain to the storage infrastructure so that, for example, changes to security policies of storage resources can be quickly performed. The universal storage manager additionally permits the full backup of tenant data on a storage device and the management of such backup. Lastly, the universal storage manager allows for enhanced release of storage space after the deletion of data for a particular tenant.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
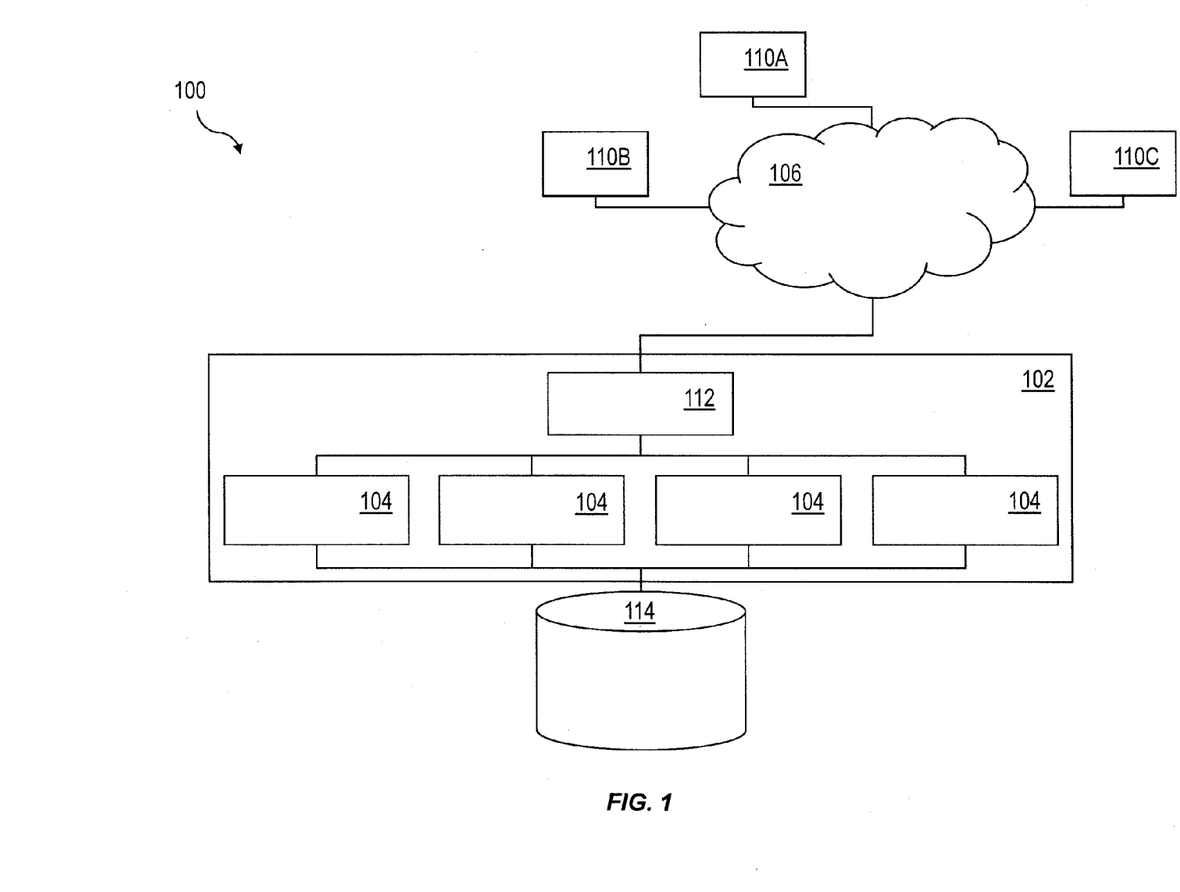
FIG. 1 is a diagram of a multi-tenant computing system.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" of a multi-tenant computing system) supported by a single software delivery architecture 100. One example of such a software delivery architecture can include features similar to those of the Business ByDesign™ software available from SAP AG (Walldorf, Germany).

For a system in which the application server 102 includes multiple server systems 104, the application server can include a load balancer 112 to distribute requests and actions from users at the one or more organizations 110A-110C to the one or more server systems 104. A user can access the software delivery architecture across the network using a thin client, such as for example a web browser or the like, or other portal software running on a client machine. The application server 102 can access data and data objects stored in one or more data repositories 114.

Figure 2:
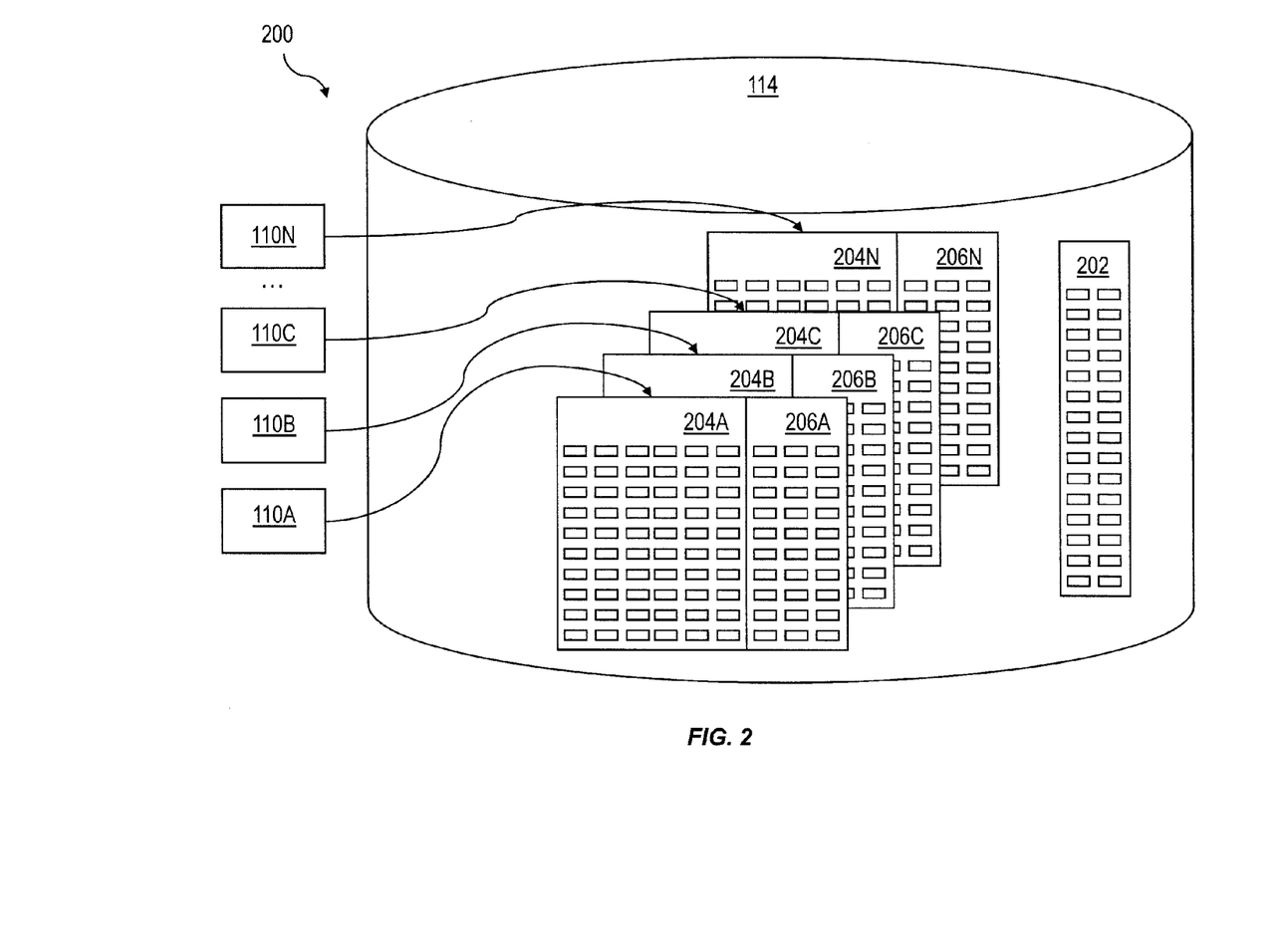
FIG. 2 is a diagram illustrating various types of content stored in the multi-tenant computing system of FIG. 1.

To provide for customization of the core software platform for each of multiple organizations supported by a single software delivery architecture 100, the data and data objects stored in the repository or repositories 114 that are accessed by the application server 102 can include three types of content as shown in FIG. 2: core software platform content 202, system content 204, and tenant content 206. Core software platform content 202 includes content that represents core functionality and is not modifiable by a tenant. System content 204 can in some examples be created by the runtime of the core software platform and can include core data objects that are modifiable with data provided by each tenant. For example, if the core software platform is an enterprise resource planning (ERP) system that includes inventory tracking functionality, the system content 204A-204N can include data objects for labeling and quantifying inventory. The data retained in these data objects are tenant-specific, for example, each tenant 110A-110N stores information about its own inventory.

Tenant content 206A-206N includes data objects or extensions to other data objects that are customized for one specific tenant 110A-110N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 206 can include condition records in generated condition tables, access sequences, price calculation results, or any other tenant-specific values. A combination of the software platform content 202 and system content 204 and tenant content 206 of a specific tenant are presented to users from that tenant such that each tenant is provided access to a customized solution having data that is available only to users from that tenant.

Figure 3:
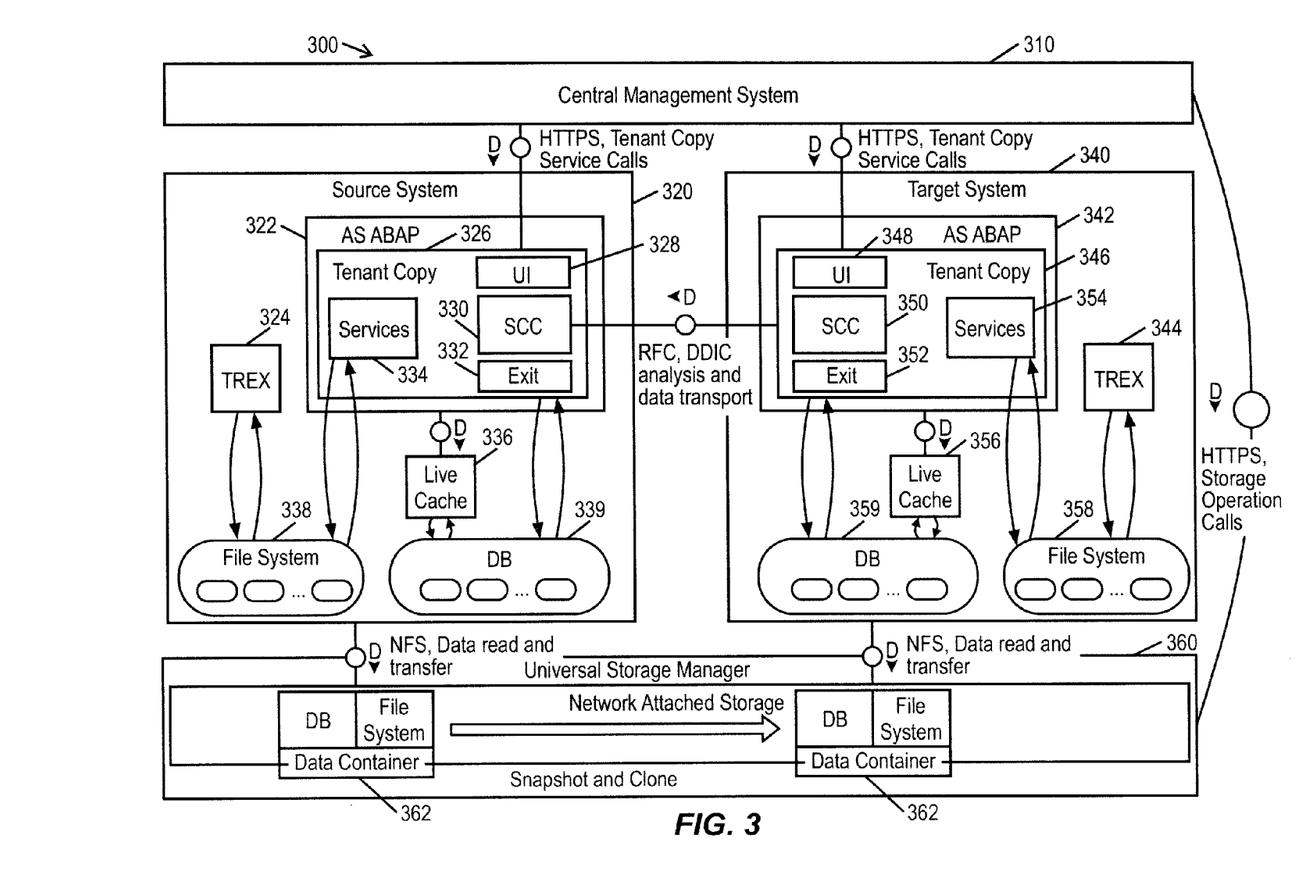
FIG. 3 is a diagram illustrating a multi-tenant computing system with a storage infrastructure utilizing a universal storage manager application.

FIG. 3 is a diagram 300 illustrating a multi-tenant computing system that includes a central management system 310 which is coupled to a source system 320 and a target system 340 (both of which can be characterized as tenants). In this regard, a snapshot and clone operation is being performed to essentially duplicate the system content and/or tenant content in the source system 320 at the target system 340. Each of the source system and target system can include an application server 322, 342, a tenant copy containing, for example, tenant content and including modules for accessing same. Each tenant copy 326, 346 can include a user interface 328, 348 enabling access to data/operations via the central management system 310 (via, for example, a web service interface). Each tenant copy 326, 346 can include a supply chain cockpit 330, 350 which provides various views on data and an exit 332, 352 which in turn provides an interface to one or more coupled database systems 339, 359 (which can each also include live caching functionality 336, 356). The source system 320 and the target system 340 can also include or access a search engine 324, 344 (which can be, for example, the SAP TREX system) to access one or more documents in file systems 338, 358. The search engines 324, 344 an be accessed via services modules 334, 354 in each of the tenant copies 326, 346.

Both of the source system 320 and the target system are respectively coupled to a storage infrastructure 360 that includes one or more storage devices 362, 364 (which in turn can include one or more of a database, file system, and a data container). The storage infrastructure 360 can be considered as network attached storage. The storage infrastructure utilizes a universal storage manager 366 application as will be described in further detail below.

Figure 4:
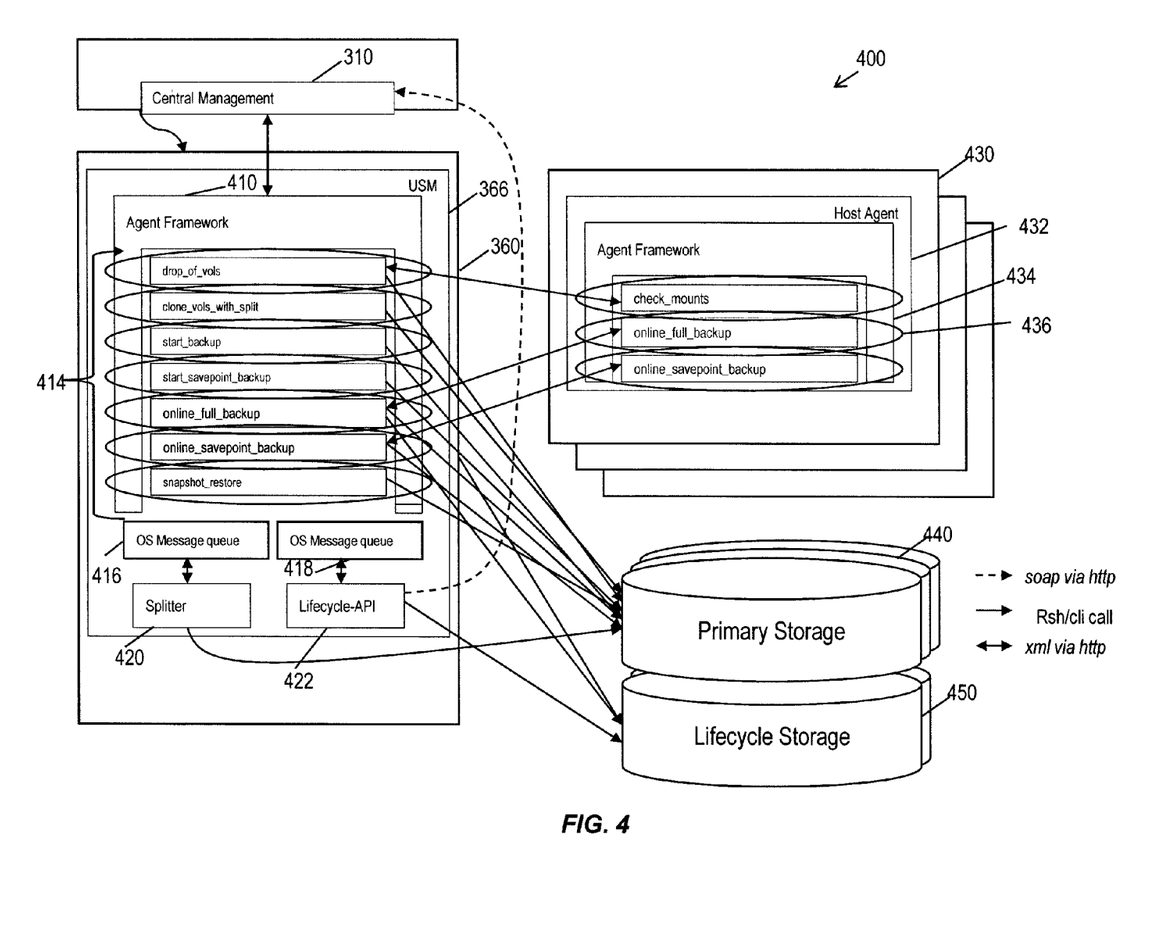
FIG. 4 is a diagram illustrating interactions between a central management system, a universal storage manager, and storage devices.

FIG. 4 is a diagram 400 illustrating the central management system 310 and how it interacts with the universal storage manager 366. The universal storage manager 366 can be a standalone application. The universal storage manager 366, in some implementations, can include script-based execution units 414. The central management system 310 and the universal storage manager 366 can communicate using XML/SOAP messages transported via HTTPs.

In the diagram 400 of FIG. 4, two types of storage devices are illustrated, namely primary storage 440 and lifecycle storage 450. Various operations on such storage devices 440, 450 are handled by the execution units 414 forming part of an agent framework 410 within the universal storage manager 366. These operations can include cloning, deletion, creation of snapshots, or start of backups, etc. These operations can each be handled by separate execution units 414. The operations relating to the storage devices 440, 450 can take the form of remote shell (RSH)/call level interface (CLI) calls.

The universal storage manager can include one or more message queues 416, 418 which handle messages as may be needed. The universal storage manager can additionally include a splitter 420 that initiates the splitting of cloned storage volumes within either of the primary storage 440 or the lifecycle storage 450. A lifecycle-API 422 can also form part of the universal storage manager 420. The lifecycle-API 422 can observe a backup by synchronization of storage volumes from the primary storage 440 to lifecycle storage 450. The primary storage 440 can be, for example, SCSI drives which are faster but more costly than the lifecycle storage 450 (which can be, for example, SATA drives).

One or more additional storage devices 430 may additionally each include a host agent 432 forming part of an agent framework which in turn includes one more execution units 436. These execution units 436 can communicate via, for example, XML via http, with one or more of the execution units 414 to initiate various storage operations in the primary storage 440 and/or lifecycle storage 350.

Each of the operations defined by the execution units 414 can be performed by calling a web service interfaces so that they are available to other applications. In addition, the universal service manager 420 allows for the integrated and vendor-independent usage of a particular storage infrastructure (e.g., Network Appliance, EMC, IBM, etc.) and can additionally be used with a wide variety of central management systems (e.g., SAP SPC, SAP GMP, etc.).

Figure 5:
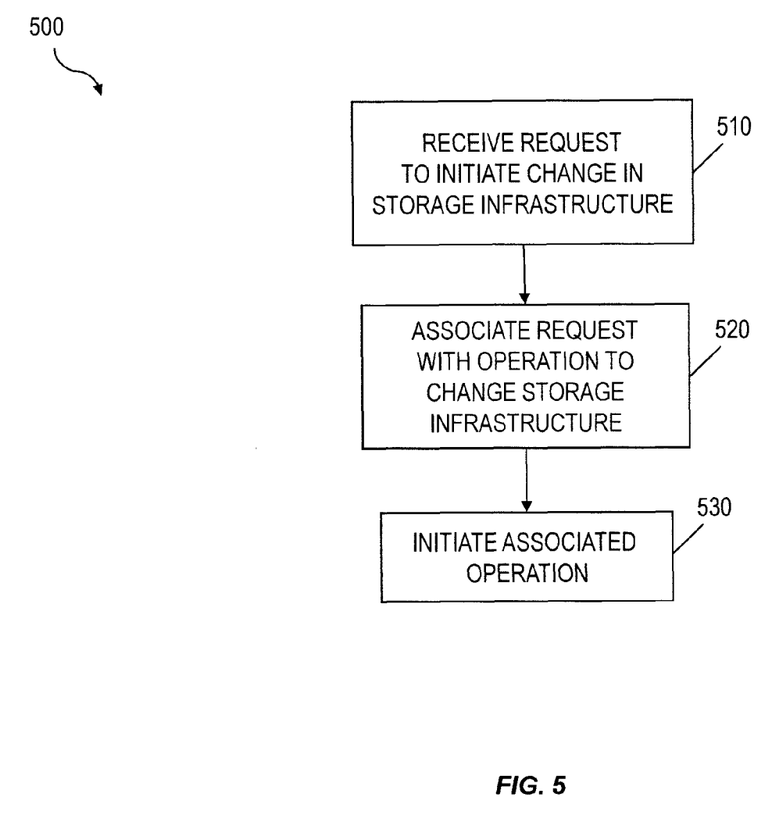
FIG. 5 is a process flow diagram illustrating the initiation of an operation in a storage infrastructure in a multi-tenant computing system.

FIG. 5 is a process flow diagram 500 illustrating, at 510, the receipt, by a universal storage manager in a multi-tenant computing system at least one message requesting a change to a storage infrastructure of the multi-tenant computing system that comprises at least one network attached storage device. Thereafter, at 520, the universal storage manager associates the requested change with one of a plurality of operations changing the storage infrastructure so that, at 530, the universal storage manager initiates the associated operation to change the storage infrastructure.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, while the descriptions of specific implementations of the current subject matter discuss delivery of enterprise resource planning software to multiple organizations via a multi-tenant computing system, the current subject matter is applicable to other types of software and data services access as well. In addition, the logic flow depicted in the accompanying figures and described herein do not require the particular order shown, or sequential order, to achieve desirable results. Other embodiments may be within the scope of the following claims.

What is claimed is:

1. A computer-implemented method comprising:
receiving, by a universal storage manager in a multi-tenant computing system, at least one message requesting a change to a storage infrastructure of the multi-tenant computing system, the storage infrastructure comprising at least one network attached storage device;

associating, by the universal storage manager, the requested change with one of a plurality of operations changing the storage infrastructure; and initiating, by the universal storage manager, the associated operation to change the storage infrastructure;

wherein the multi-tenant computing system forms part of a multi-tenant environment using a single software delivery architecture, the single software delivery architecture providing one or more customized solutions for each tenant, at least two tenants comprising a source system and a target system, each of the source system and the target system comprising a tenant copy and a search engine for searching data in at least a file system associated with at least one data repository;

wherein the multi-tenant computing system comprises:
the storage infrastructure;
at least one application server accessible over a network from the plurality of clients associated with each of multiple tenants; and
the at least one data repository containing:
core software platform content relating to the operation of the multi-tenant computing system which is not modifiable by the multiple tenants;
system content including data objects created in runtime by the multi-tenant computing system that are modifiable with data provided by a corresponding tenant, and
tenant content including data objects or extensions to data objects that are customized for a corresponding tenant, wherein data objects or extensions to data objects of a particular tenant are not available to other tenants.

2. A method as in claim 1, wherein the universal service manager comprises an agent framework.

3. A method as in claim 2, wherein the agent framework defines a plurality of execution units for executing the operations.

4. A method as in claim 3, wherein the operations can be performed by calling a web service interface associated with the corresponding execution unit.

5. A method as in claim 2, wherein the agent framework of the universal service manager is coupled to at least second agent framework on a host agent.

6. A method as in claim 1, wherein the storage infrastructure comprises a primary storage device and a lifecycle storage device, wherein access to the primary storage device is faster than access to the lifecycle storage device.

7. A method as in claim 6, wherein:
the primary storage device comprises at least a small computer system interface drive;
the lifecycle storage device comprises at least a serial ATA drive; and
the universal storage manager further comprises a lifecycle application programming interface (API) to observe a process of synchronizing data stored in the primary storage device on the lifecycle storage device.

8. A method as in claim 1, wherein the universal storage manager comprises a splitter to split cloned storage volumes in the storage infrastructure.

9. A method as in claim 1, wherein the at least one message is received from a central management system within the multi-tenant computing system, the central management system providing an interface between the multi-tenant computing system and remote clients external to the multi-tenant computing system that are associated with the tenants.

10. A method as in claim 1, wherein the messages are XML/SOAP messages transported via HTTPs.

11. A method as in claim 1, wherein:
the tenant copy includes a user interface that enables access to data associated with the at least one data repository; and
the tenant copy further includes a supply chain cockpit that displays a plurality of views of data associated with the at least one data repository.

12. A method as in claim 1, wherein the search is at least one of: an exact search, a boolean search, a wildcard search, a linguistic search, and a fuzzy search.

13. An article of manufacture comprising:
computer executable instructions non-transitorily stored on computer readable media, which, when executed by a computer, causes the computer to perform operations comprising:
receiving, by a universal storage manager in a multi-tenant computing system, at least one message requesting a change to a storage infrastructure of the multi-tenant computing system, the storage infrastructure comprising at least one network attached storage device;
associating, by the universal storage manager, the requested change with one of a plurality of operations changing the storage infrastructure; and
initiating, by the universal storage manager, the associated operation to change the storage infrastructure;
wherein the multi-tenant computing system forms part of a multi-tenant environment using a single software delivery architecture, the single software delivery architecture providing one or more customized solutions for each tenant, at least two tenants comprising a source system and a target system, each of the source system and the target system comprising a tenant copy and a search engine for accessing data in at least a file system associated with at least one data repository;
wherein the multi-tenant computing system comprises:
the storage infrastructure;
at least one application server accessible over a network from the plurality of clients associated with each of multiple tenants; and
the at least one data repository containing:
core software platform content relating to the operation of the multi-tenant computing system which is not modifiable by the multiple tenants;
system content including data objects created in runtime by the multi-tenant computing system that are modifiable with data provided by a corresponding tenant, and
tenant content including data objects or extensions to data objects that are customized for a corresponding tenant, wherein data objects or extensions to data objects of a particular tenant are not available to other tenants.

14. An article as in claim 13, wherein the storage infrastructure comprises a primary storage device and a lifecycle storage device, wherein access to the primary storage device is faster than access to the lifecycle storage device.

15. An article as in claim 14, wherein the universal storage manager further comprises a lifecycle application programming interface (API) to observe a process of synchronizing data stored in the primary storage device on the lifecycle storage device.

16. An article as in claim 13, wherein:
the universal service manager comprises a first agent framework, the first agent framework comprising a first plurality of script based execution units;
the first agent framework is coupled to at least a second agent framework on a remote host agent, the second framework comprising a second plurality of script based execution units;
a portion of the first plurality of script based execution units connect with the second plurality of script based execution units via a remote shell command of a call level interface to change the storage infrastructure.

17. An article as in claim 13, wherein the universal storage manager comprises a splitter to split cloned storage volumes in the storage infrastructure.

18. An article as in claim 13, wherein the at least one message is received from a central management system within the multi-tenant computing system, the central management system providing an interface between the multi-tenant computing system and remote clients external to the multi-tenant computing system that are associated with the tenants.

19. A multi-tenant computing system forming part of a multi-tenant environment using a single software delivery architecture, the system comprising:
at least one application server accessible over a network from the plurality of clients associated with each of multiple tenants, each tenant being provided one or more corresponding customized solutions by the single software delivery architecture, data for each tenant being stored separately, at least two tenants comprising a source system and a target system, each of the source system and the target system comprising a tenant copy and a search engine for accessing data in at least a file system associated with at least one data repository; and
at least one data repository containing:
core software platform content relating to the operation of the multi-tenant computing system which is not modifiable by the multiple tenants;
system content including data objects created in runtime by the multi-tenant computing system that are modifiable with data provided by a corresponding tenant, and
tenant content including data objects or extensions to data objects that are customized for a corresponding tenant, wherein data objects or extensions to data objects of a particular tenant are not available to other tenants; and
a storage infrastructure executing a universal storage manager application providing a web service interface to initiate change operations to the storage infrastructure.

\* \* \* \* \*